(12) United States Patent
Julien et al.

(10) Patent No.: US 6,419,109 B1
(45) Date of Patent: Jul. 16, 2002

(54) TIGHTHEAD DRUM

(75) Inventors: Robert A. Julien; John H. Malik, both of Naperville, IL (US)

(73) Assignee: Russell-Stanley Corporation, Bridgewater, NJ (US)

( * ) Notice: Subject to any disclaimer, the term of this patent is extended or adjusted under 35 U.S.C. 154(b) by 0 days.

(21) Appl. No.: 09/802,140

(22) Filed: Mar. 8, 2001

(51) Int. Cl.$^7$ ................................. B65D 8/00
(52) U.S. Cl. ................. 220/608; 220/601; 220/634
(58) Field of Search ........................ 220/608, 601, 220/634, 4.05

(56) References Cited

U.S. PATENT DOCUMENTS

| | | | |
|---|---|---|---|
| 4,674,648 A | * 6/1987 | Przytulla | ................ 220/601 |
| 4,736,862 A | * 4/1988 | Hammes et al. | ............ 220/601 |
| 5,033,639 A | 7/1991 | Przytulla | |
| 5,543,107 A | 8/1996 | Malik et al. | |
| 5,984,133 A | * 11/1999 | Schutz | ............... 220/608 X |
| 6,024,245 A | 2/2000 | Malik et al. | |
| 6,026,980 A | 2/2000 | Malik et al. | |
| 6,045,000 A | * 4/2000 | Rauworth et al. | .......... 220/601 |
| 6,126,033 A | * 10/2000 | Suttoni | ................. 220/634 |
| 6,145,694 A | * 11/2000 | Roesing | ................ 220/601 |
| 6,182,853 B1 | * 2/2001 | Julien | ............... 220/634 X |

FOREIGN PATENT DOCUMENTS

JP 61-93038 5/1986

* cited by examiner

*Primary Examiner*—Steven Pollard
(74) *Attorney, Agent, or Firm*—Hedman & Costigan, P.C.

(57) ABSTRACT

A one piece thermoplastic tighthead drum having a drum body, a bottom, a top and at least one handling ring, at least one of said top and/or bottom including a raised central section surrounded by an annular groove defined by a groove floor, a first sidewall connecting the groove floor and the raised central section and a second sidewall comprising at least a portion of the handling ring. The drum body, the top and/or bottom having the handling ring associated with it and the handling ring converge in an area of merger, the interior surface of which comprises a smooth undulating surface having at least four radii. The configuration provides a double hinge for minimizing the effects of drop impact in the area of merger.

23 Claims, 7 Drawing Sheets

TIGHTHEAD DRUM

FIELD OF THE INVENTION

The present invention relates to the field of industrial drums and more particularly to the field of tighthead or closed head drums made of thermoplastic materials.

BACKGROUND OF THE INVENTION

Industrial containers made of thermoplastic materials are well known for the transportation and storage of materials, including hazardous materials in liquid and powder form. Such drums are generally categorized as open head drums, where the top of the drum comprises a removable lid attached to the drum by a tension ring, and closed head or tighthead drums where the top is integrally formed with the drum.

All such drums are regulated by the United States Department of Transportation which requires that the drums perform to certain minimum standards in a variety of physical tests. One such test is a "drop" test where a drum full of a liquid is dropped on its side from a predetermined height.

Moreover, both open top and tighthead drums experience challenges when the full drum needs to be moved since a full 55 gallon drum can weigh up to 880 pounds. As such, it is preferred that industrial drums include a handling ring which can be engaged by a mechanical handling means such as a parrot beak, which is well known in the art.

With specific respect to plastic tighthead drums, early versions comprised separately formed handling rings which were subsequently attached to the drum by a compression fit. Later innovations allowed for the manufacture of plastic drums with integrally formed handling rings. The integral handling rings were formed by compression molding within the blow mold during the blow molding process.

However, these designs each suffered inadequacies during drop testing to determine impact resistance, due to the geometry in the area where the handling ring was formed on the drum body. More particularly, plastic drums with integrally molded handling rings generally have a section thicker than the drum body at the intersection of the handling ring and the drum body. This section is therefore often uneven and contains stress points that contribute to failure during mandatory drop testing, which are required to be conducted at low temperatures.

It has been found that the thicker sections provided places where the polyethylene or other polymeric thermoplastic material formed weak crystalline structures due to the slow cooling in that area. Such crystalline structures do not adequately resist breakage during drop impact resistance testing at low temperatures, i.e., at 0° F. Additionally, the irregularly formed extrudate in the area of the intersection of the handling ring and the drum body provides points at which the stresses inherent during drop impact create an initiation point for the cleavage of the crystalline structure, causing failure.

Various configurations of handling rings and the area of intersection of the handling ring and the drum bodies have been developed in a number of attempts to avoid failure in the area of the handling ring during drop testing, however, improvement is needed.

It is therefore an object of the present invention to provide a thermoplastic closed head drum including an integrally formed handling ring with improved resistance to failure in the area of attachment of the handling ring during drop testing.

SUMMARY OF THE INVENTION

This and other objects are achieved by the present invention which is directed to a one piece thermoplastic tighthead drum comprising a generally cylindrical body, an integral bottom at the lower end of the body and an integral top at the upper end of the body. At least one integral handling ring is included which extends from the drum at the area in which the drum body merges with the at least one of the top and/or bottom, referred to herein as the area of merger.

The top and/or bottom of the drum having the handling ring associated with it includes a raised central section of the top or a lowered central portion of the bottom, commonly referred to herein as a raised central portion, surrounded by an annular groove. The annular groove is defined by a substantially flat or horizontal floor, a first sidewall connecting the floor to the raised central portion and a second sidewall comprising at least a portion of the handling ring extending from the drum body at the groove floor. Thus, the handling ring extends from the drum at the area where the drum body converges with the top and/or bottom at the outer perimeter of the annular groove to form the area of merger between the body, the top and/or bottom having the handling ring associated with it and the handling ring.

The interior surface of the drum in the area related to the convergence or merger of the drum body, the annular groove and the handling ring is formed without sharp changes in direction or notches. The inner surface in the area of merger is manufactured in the form of an undulating surface comprising four (4) radii, each of which relate to a change of direction along the interior surface of less than 90°. When the handling ring is extending upwardly, either at the drum top when the drum is right side up or at the drum bottom when the drum is upside down, the first radius turns inward of the surface in an arc from the upper sidewall of the drum body to the bottom of the handling ring. The second radius turns upward from the first radius in an arc from the bottom of the handling ring to generally under the side of the handling ring. The third radius turns inward from the second radius in an arc from generally under the side of the handling ring to below the floor of the annular groove. The fourth radius turns upward from the third radius in an arc from below the floor of the annular groove to the inside of the first sidewall of the annular groove. The interior surface then continues along the interior of the first sidewall and to a smooth radius where the first sidewall meets the raised central section.

This configuration of a smooth undulating inner surface in relation to the sidewall, handling ring and top and/or bottom followed by the change in direction from the first sidewall to the raised central section provides a double hinge above the area where the handling ring merges with the drum body, traditionally the area most prone to failure during drop impact. The double hinge absorbs the energy of the impact during drop conditions thus preventing stresses from pulling or bending in the critical weld area where the handling ring merges with the drum body.

The configuration of the interior surface at the area of merger, including the obtuse radii angles, is preferably formed by the excess material or extrudate forced out of the handling ring as it is compression molded. The extrudate in the present invention is adapted to create the interior profile in as close to a linear formation as possible in the area of merger of the drum sidewall handling ring and the top of the drum.

BRIEF DESCRIPTION OF THE DRAWINGS

The present invention will be better understood when considered in view of the attached drawings, in which like reference characters indicate like parts. The drawings, however, are presented merely to illustrate the preferred embodiment of the invention without limiting the invention in any manner whatsoever.

DETAILED DESCRIPTION OF THE PREFERRED EMBODIMENT

Figure 1:
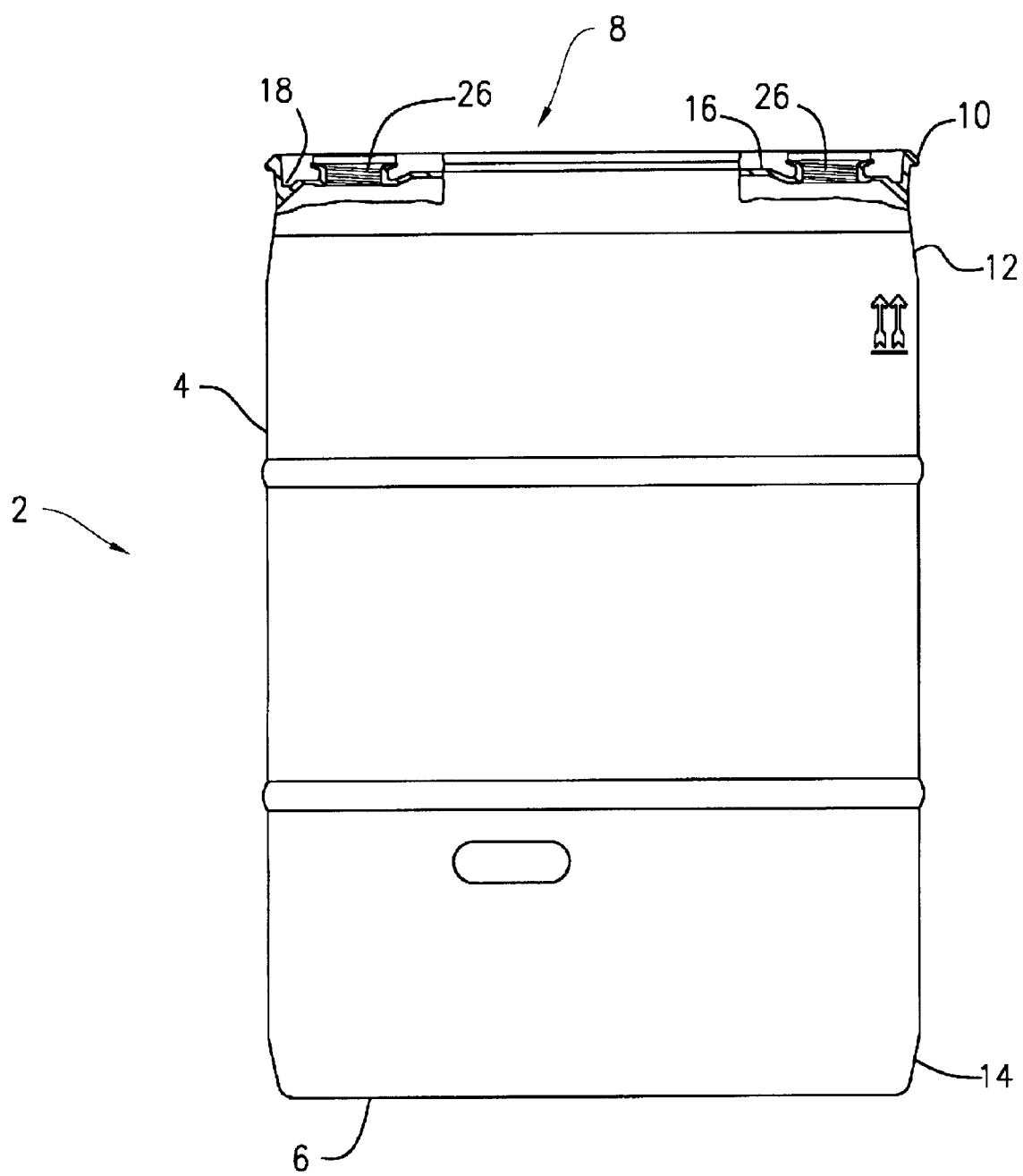
FIG. 1 is a partial cross sectional elevation of the tighthead drum of the present invention.
Figure 2:
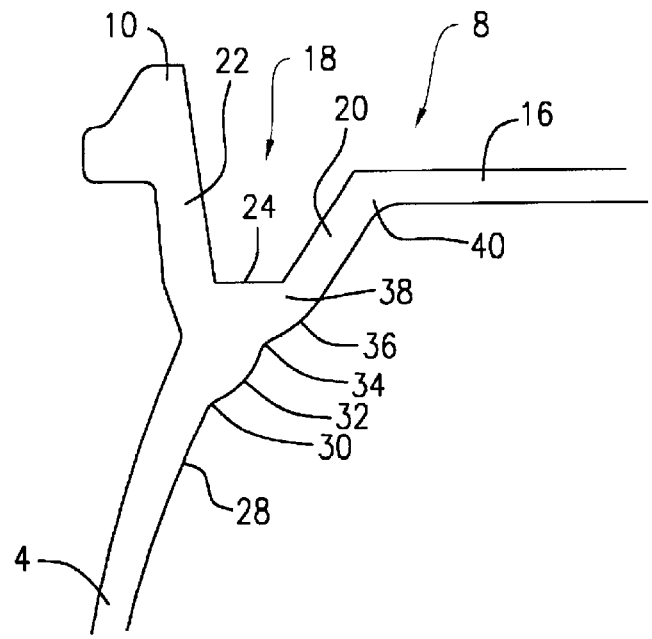
FIG. 2 is a partial cross sectional elevation of the area where the sidewall, top and handling ring merge on the tighthead drum of preferred embodiment of the present invention.

As shown in the drawings, and more particularly FIGS. 1 and 2, the present invention is directed to a one piece thermoplastic tighthead drum 2 having a generally cylindrical body 4 formed with an integral bottom 6, an integral top 8 and an integral handling ring 10. Although the drum 2 may be formed of any suitable thermoplastic material by any known process, use of a polyethylene material in a blow mold using parison wall programming is the preferred method of manufacture in the preferred embodiment.

The body 4 is described as generally cylindrical, however, it is preferred that the body 4 have a top portion 12 adjacent the drum top 8 and a bottom portion 14 adjacent the drum bottom 6 which is referred to herein as conical, as shown in FIG. 1. In this regard, conical is defined herein as having a change in diameter over a length, including a substantially straight line as in a truncated cone or a substantially curved line as in a truncated sphere or some combination thereof.

Figure 2A:
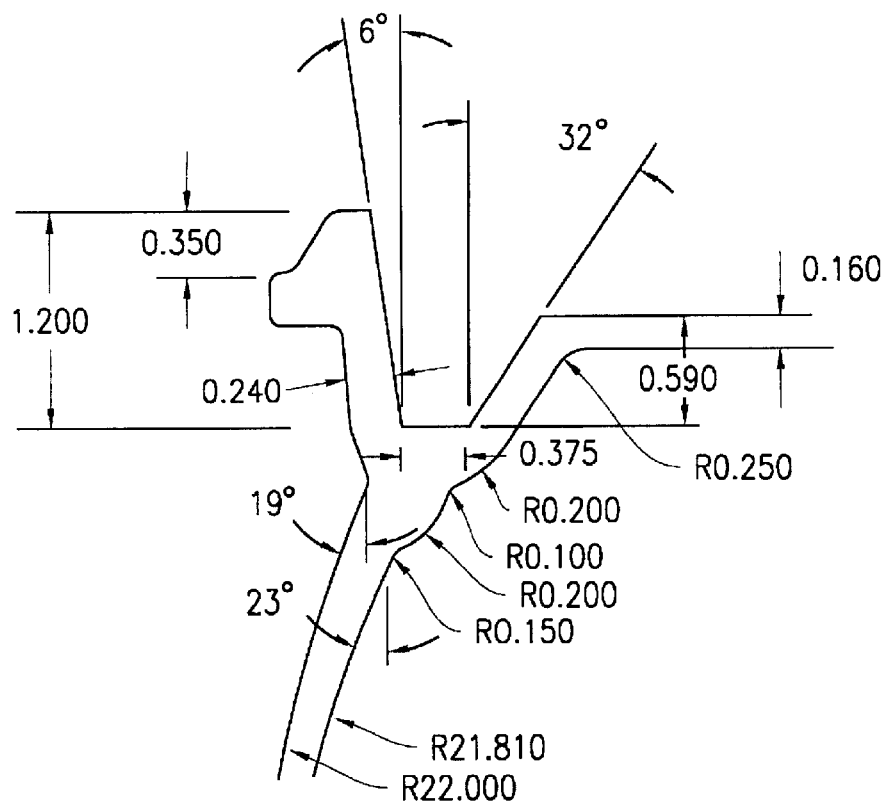
FIG. 2A is the drawing of FIG. 2 showing the dimensions of the preferred embodiment.

It is preferred that at least the uppermost end of the conical top portion 12 extend upward toward the area of merger of the top 8, body 4 and handling ring 10 at an angle. A suitable angle is considered to be from about 10° to about 26°, most preferably with an exterior angle of about 19° relative to the axis of the drum 2 from point A to point B as shown in FIG. 2A. The preferred thickness of the drum body 4, top 8 and bottom 6, other than in the area of merger of the drum body 4, top 8 and handling ring 10, is preferably substantially constant, with generally from about 0.140 to about 0.160 inches being most preferred.

The drum bottom 6 is preferably formed integral with the drum body 4, as set forth above, as is well known in the art of blow molded plastic drums. Various configurations of the drum bottom 6 are contemplated and any suitable configuration may be used with the present invention, including a bottom having a foot ring similar to the handling ring described herein or of an alternative design, and/or a design to promote stacking of the drums, or the like.

The drum top 8 is also integrally formed with the drum body 4. The configuration of the top 8 for use in the present invention includes a raised central section 16 interior with an annular groove 18 located outward of the raised central section 16 at the perimeter of the top 8. Openings 26, such as standard bung openings as well known in the art or similar openings to access the contents of the drum 2, are preferably located at least in part within or on the raised central section 16.

The annular groove 18 is bounded by a first sidewall 20, a second sidewall 22 and a groove floor 24 between said first and second sidewalls 20 and 22. In the preferred embodiment shown in the drawings, the first sidewall 20 of the annular groove 18 connects the groove floor 24 to the raised central section 16 of the top 8 and the second sidewall 22 comprises the substantially vertical member of the handling ring 10. The groove floor 24 is preferably substantially horizontal and connects the first sidewall 20 and the second sidewall 22. The width of the annular groove floor 24 is of sufficient width to accept the extrudate from the compression molding of the handling ring and result in an interior surface with four (4) radii of obtuse angle and a generally linear configuration. In its most preferred embodiment, as shown in FIG. 2A, the groove floor 24 is about 0.375" from the first sidewall 20 to the second sidewall 22 and substantially all of the raised central section 16 is at least about 0.590" above the groove floor 24.

As set forth above, the second sidewall 22 comprises at least a portion of the substantially vertical portion of the handling ring 10. In this regard, the handling ring 10 of the invention preferably extends upwardly and outwardly from the area where the drum body 4 and top 8 meet. In the most preferred embodiment, the substantially vertical portion of the handling ring 10 extends upwardly and outwardly at an angle of about 6° from vertical. The most preferred thickness of the substantially vertical portion of the handling ring 10 is about 0.240" in this embodiment.

Figures 3A, 3B:
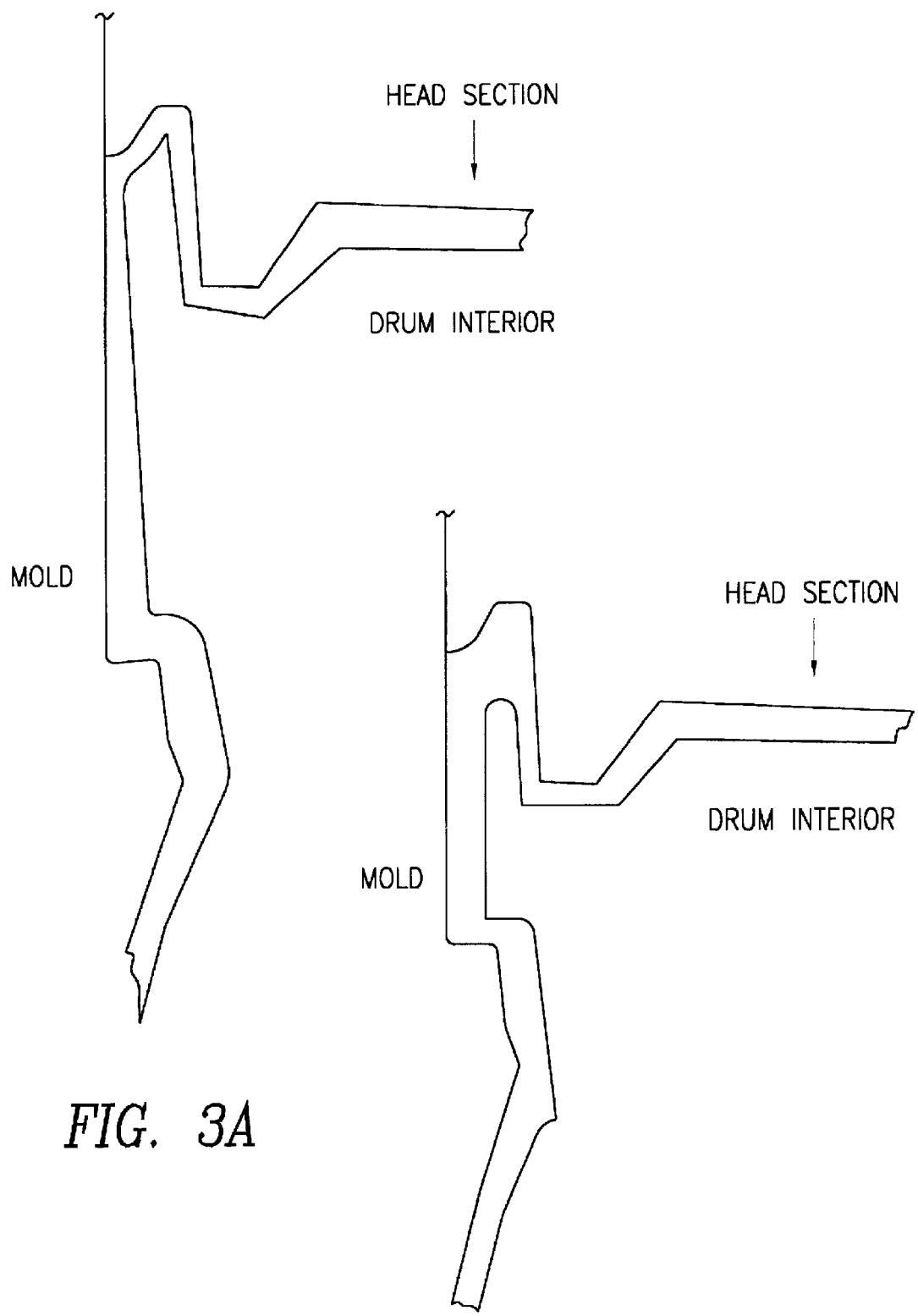
FIGS. 3A–3E are cross sectional views of the preferred blow mold parts in various stages during formation of the area of the merger of the sidewall, top and handling ring of the tighthead drum of the present invention.
Figure 3C:
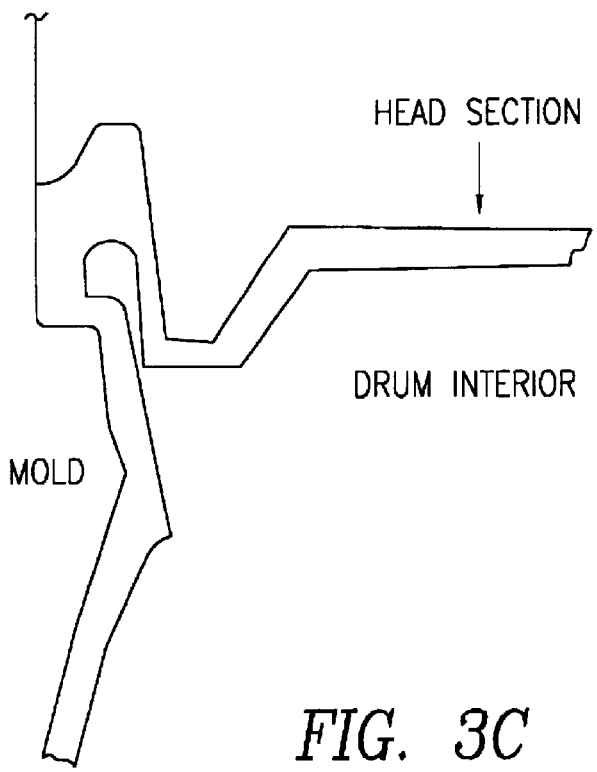
Figure 3D:
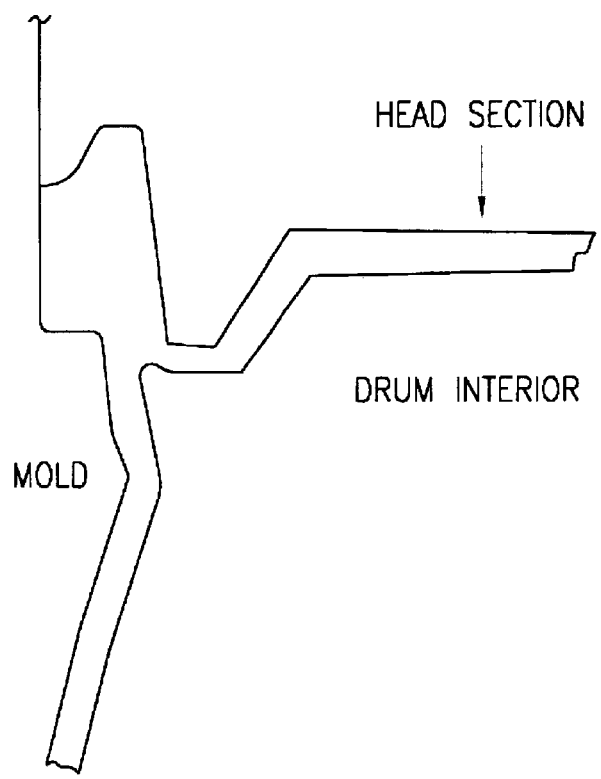
Figure 3E:
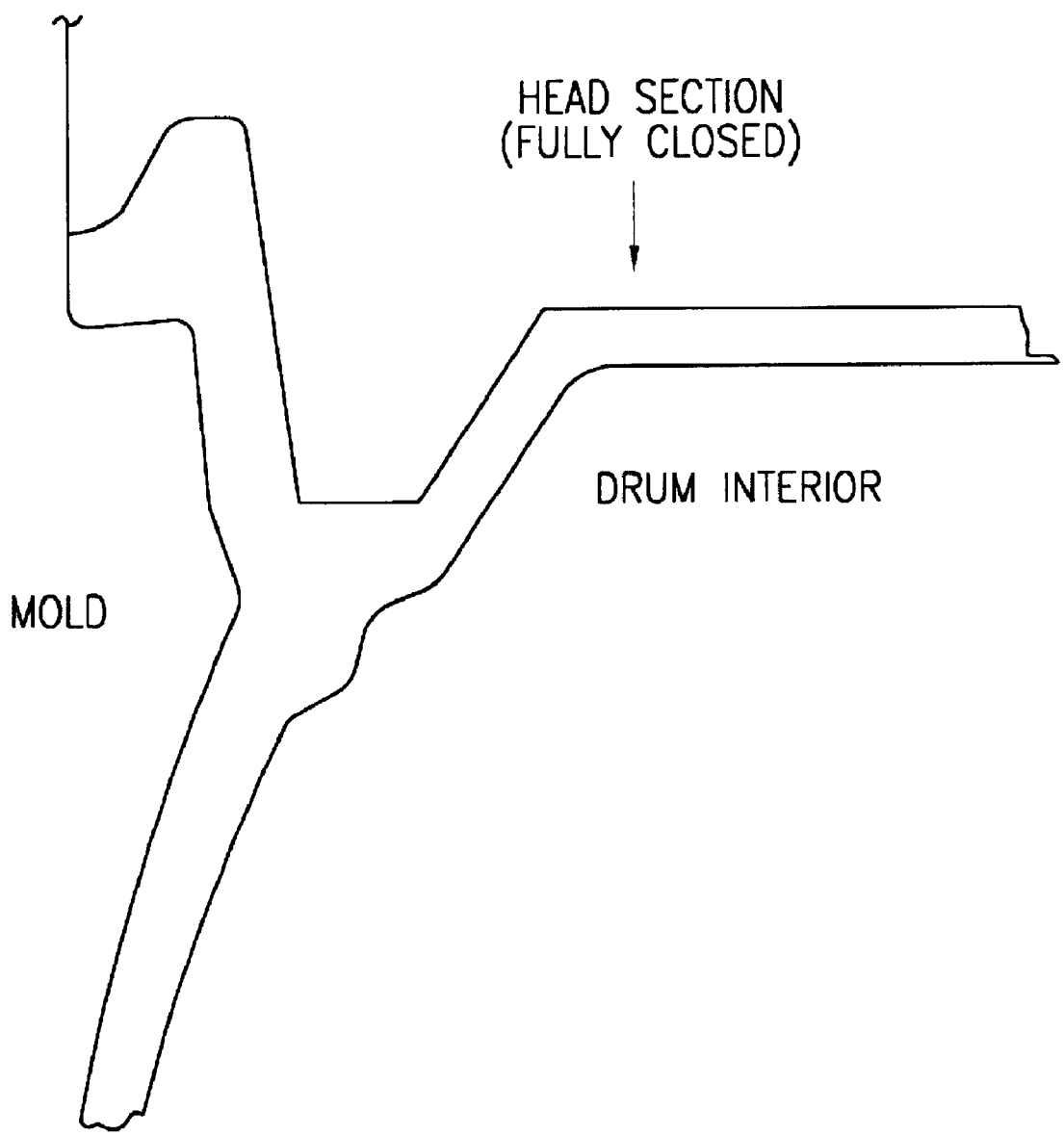

The drum body 4, the top 8 and the handling ring 10 merge during formation of the drum 2 as shown in FIGS. 3A–3E. FIG. 3A is an illustration of the compression mold parts of the blow mold used in the preferred process in their fully open position when the plastic material of the drum 2 is first blown against the interior of the mold. FIG. 3B shows the compression mold parts closing to begin forming the handling ring 10 on the drum 2. FIG. 3C shows the handling ring 10 forming at a time when there is still a space within the area that will become the substantially vertical portion of the handling ring 10. FIG. 3D shows the compression mold parts closing to begin to close the open area within the handling ring 10. FIG. 3E illustrates the compression mold parts in their fully closed position with the excess plastic forced out of the handling ring 10 as the compression mold parts close fully.

The mold geometry and the amount of plastic used in the blow molding process are selected to ensure the proper formation of the plastic extrudate from the closure of the compression mold parts during creation of the handling ring 10. In this regard, the geometry of the exterior of the drum is designed to induce the plastic flow such that the interior surface is formed evenly and uniformly without having to rely on tightly controlled molding steps, which are difficult to maintain in a commercial molding operation.

More specifically, the mold geometry and amount of plastic material used allow the extrudate to flow in such a manner as to create an interior surface 28 free of any sharp changes in direction, without notches, and creating a smooth undulating interior surface 28. The indentation of point A shown on FIG. 2A relative to the smooth outer surfaces of the handling ring 10 and drum body 4 diverts the flow of material during formation of the handling ring 10 to create the smooth undulating interior surface 28 which includes at least four radii relating to changes in direction along the interior surface 28, each less than 90°, in the area of merger of the body 4, top 8 and handling ring 10.

The four radii are shown in FIGS. 2 and 2A. Starting from the body 4 and moving upward, the first radius 30 is an arc turning inward from the conical top portion 12 of the drum body 4 to under the handling ring 10. The second radius 32 turns upward from the first radius 30 in an arc from the bottom of the handling ring 10 to under the side of the handling ring 10 which forms the second sidewall 22 of the annular groove 18. The third radius 34 turns inward from the second radius 32 in an arc from under the side of the handling ring 10 to below the floor 24 of the annular groove 18. The fourth radius 36 turns upward from the third radius 34 in an arc from below the floor 24 of the annular groove 18 to the interior of the first sidewall 20 of the annular groove 18.

The geometry of the mold yields a first radius 30 of about 0.15", a second radius of about 0.20", a third radius of about 0.10" and a fourth radius of about 0.20", all preferably with a variance of about 0.05". These radii create a smooth interior surface 28 which minimizes the overall wall thickness as well as eliminate from the interior surface 28 any sharp changes of thickness and accommodate a commercial blow molding process.

At the area where the first sidewall 20 meets the raised central section 16 of the top 8, the interior surface 28 is also smooth, forming an additional radius of about 0.250" with a variance of about 0.05". In this regard, it is preferred that all changes in direction along the entire interior surface of the drum 2 be adapted to maintain a smooth surface.

Figure 4A:
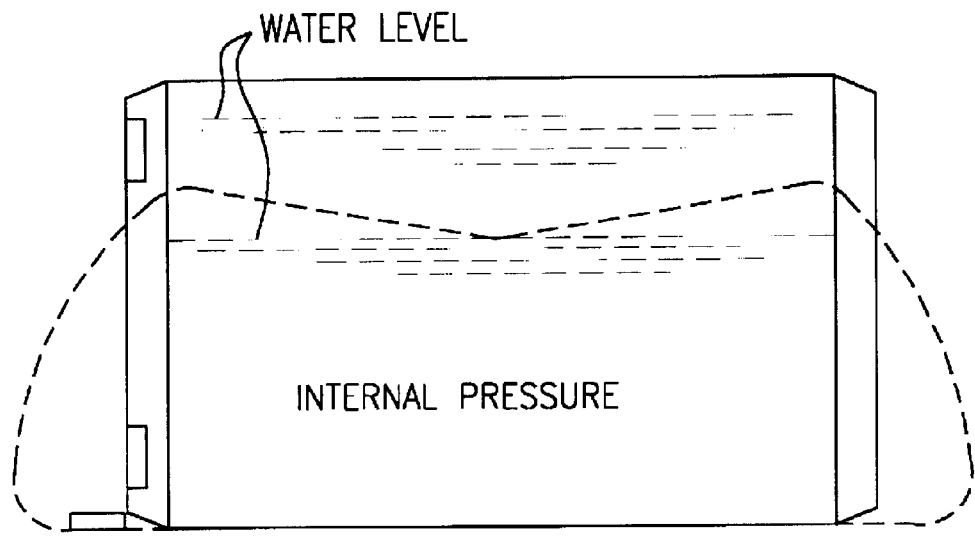
FIG. 4A is a side elevation showing a standard full drum with the solid line indicating its normal shape and the dashed line indicating the deformed shape during drop impact.
Figure 4B:
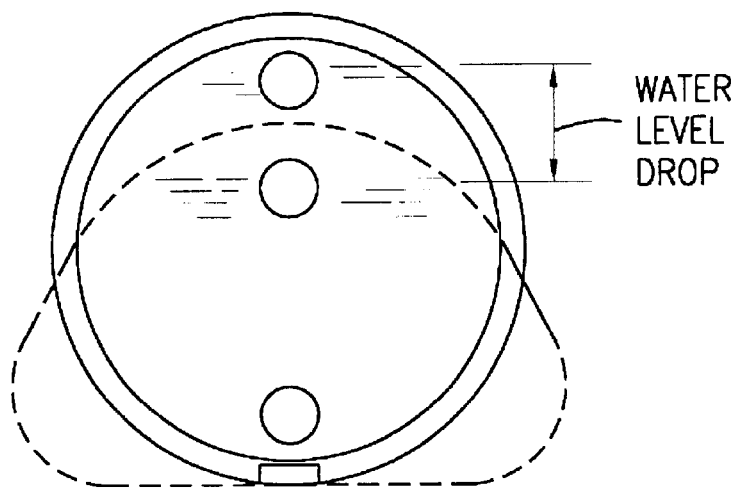
FIG. 4B is a front elevation of the drum shown in FIG. 4A with the solid line indicating its normal shape and the dashed line indicating the deformed shape during extreme drop impact conditions.
Figure 5:
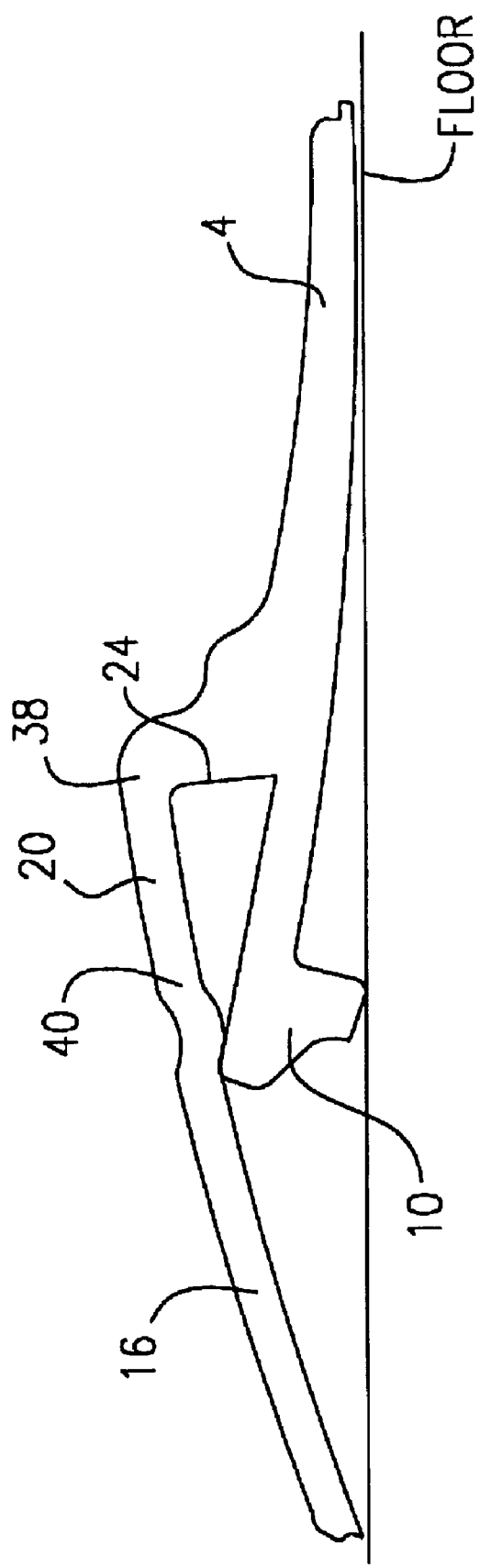
FIG. 5 is a partial side cross sectional view of the area of merger of the present invention during extreme drop impact conditions.

As shown in FIG. 2, the undulating interior surface 28 of the preferred embodiment of the present invention runs along a generally straight or slightly curved projection so that no sharp changes in direction occur. This configuration minimizes the strains on the material during drop conditions, as shown in FIGS. 4A and 4B. Under these conditions, when the area of the handling ring 10 of the present invention flattens out with both the conical top portion 12 of the drum body 4 and the drum top 8 pressed into a plane against the floor onto which the full drum is dropped, as shown in FIG. 5.

More particularly, the configuration of the area of merger and the area where the first sidewall 20 converges with the raised central section 16 provides a unique double hinge above the handling ring 10 for the flattening of the area during drop conditions. A first hinge 38 is found at the area where the first sidewall 20 merges with the groove floor 24. Thus, when the drum 2 is dropped the first sidewall 20 pivots in relation to the groove floor 24 about the first hinge 38. A second hinge 40 is found at the area where the first sidewall 20 merges with the raised central section 16 of the top 8. This second hinge 40 provides an area where the raised central section 16 of the top 8 can pivot in relation to the first sidewall 20. The combined effect of the two hinges 38 and 40 is to minimize the stress in the critical weld area relating to the change of direction from the substantially vertical drum body 4 to the substantially horizontal top 8.

In the most preferred embodiment, the first sidewall 20 extends upwardly and inwardly from the groove floor 24 to the raised central section 16 at an angle of from about 24° to about 38° from vertical with about 32° being most preferred. Due to the effect of the double hinge presented in the present invention, a change of direction of close to 90° from the drum body 4 to the top 8 does not take place in a single area to provide the entire flex during drop conditions. Instead, the flattening of the body 4 and the top 8 onto the plane of the floor is achieved by the two hinges 38 and 40 with each contributing to significantly less than a 90° change in direction when the full drum 2 is dropped on its side. As such, the drum 2 of the present invention provides improved drop performance, minimizing failure in the area of the handling ring 10.

If a handling ring is used at the drum bottom, commonly known as a foot ring, it is preferred that the area of merger of the lower drum body, foot ring and bottom, including the interior surface related thereto, have the configuration of the area of merger of the upper drum body, handling ring and top, including the related interior surface as described herein, only inverted.

Variations, modifications and alterations to the preferred embodiment of the present invention described above will make themselves apparent to those skilled in the art. For example, the structure of the drum can be produced by injection molding parts such as the top and bottom and welding these to a drum body. Additionally, the angles and dimensions of such elements as the handling ring, first sidewall, groove floor and elevation from the groove floor to the raised central section can be easily changed to achieve the purposes of the particular environment. All such changes are intended to fall within the spirit and scope of the present invention, limited solely by the appended claims.

We claim:

1. A one piece thermoplastic drum comprising
a drum body having an upper end and a lower end,
at least one handling ring,
a bottom at the lower end of the drum body, and
a top at the upper end of the drum body, at least one of the top and bottom comprising a raised central section and an annular groove outward of said raised central section, the annular groove being formed by a groove floor, a first sidewall extending from the groove floor to the raised central section and a second sidewall comprising at least a portion of the handling ring wherein the at least one of the top and bottom, the drum body and the handling ring converge in an area of merger having an interior surface associated therewith, said interior surface comprising a smooth undulating surface comprising at least four radii.

2. The drum of claim 1 wherein the upper end of the drum body is substantially conical, sloping inward in the direction upward along the upper end of the drum body.

3. The drum of claim 2 wherein at least a portion of the upper end of the drum body adjacent the top has an angle of from about 10° to about 26°.

4. The drum of claim 3 wherein the angle is 19°.

5. The drum of claim 1 wherein the handling ring comprises a substantially vertical portion and a substantially horizontal portion.

6. The drum of claim 5 wherein the handling ring is associated with the top of the drum and the substantially vertical portion of the handling ring extends upwardly and outwardly from the area of merger when the drum is upright.

7. The drum of claim 6 wherein the vertical portion extends upwardly and outwardly at an angle of about 6° from vertical.

8. The drum of claim 7 further comprising an outer surface comprising a smooth surface of the upper end of the drum body extending upwardly and inwardly, a smooth surface of the substantially vertical portion of the handling ring extending upwardly and outwardly and an indentation in the area where the surface of the upper end of the drum body converges with the surface of the handling ring.

9. The drum of claim 1 wherein the groove floor is about 0.375" wide.

10. The drum of claim 1 wherein substantially all of the raised central section of the at least one of the top and bottom is at least about 0.590" axially beyond the groove floor.

11. The drum of claim 1 wherein the four radii create a continuous smooth undulating interior surface, the first radius comprising an arc from the interior of the drum body to below the handling ring and the fourth radius comprising an arc from below the groove floor to the interior of the first sidewall, with the second and third radii located between the first and fourth radii.

12. The drum of claim 1 further comprising a smooth radius on an interior surface of the at least one of the top and bottom where the first sidewall merges with the raised central section.

13. The drum of claim 12 further comprising a first hinge about which the groove floor and the first sidewall pivot and a second hinge about which the first sidewall and the central section of the at least one of the top and bottom pivot during drop impact.

14. The drum of claim 1 wherein the thermoplastic is polyethylene.

15. The drum of claim 1 wherein the drum is formed by blow molding with compression molding of the handling ring.

16. The drum of claim 1 wherein none of the at least four radii corresponds to a change of direction of substantially less than about 90°.

17. The drum of claim 16 wherein none of the at least four radii corresponds to a change of direction of less than 90°.

18. A one piece thermoplastic drum comprising
a drum body having an upper end and a lower end,
at least one handling ring,
a bottom at the lower end of the drum body, and
a top at the upper end of the drum body, at least one of the top and the bottom comprising a raised central section and an annular groove outward of said raised central section, the annular groove being formed by a groove floor, a first sidewall extending from the groove floor to the raised central section and a second sidewall comprising at least a portion of the handling ring, further comprising two hinges radially inward of the handling ring including a first hinge in the area where the groove floor converges with the first sidewall and a second hinge in the area where the first sidewall converges with the raised central section, wherein said drum has a smooth interior surface free of sharp changes of direction.

19. The drum of claim 18 wherein the groove floor is substantially horizontal when the drum is in its upright position.

20. The drum of claim 18 wherein the first sidewall extends from the groove floor to the raised central section at an angle of from about 28° to about 34°.

21. The drum of claim 18 wherein the drum is formed by blow molding with the handling ring formed by compression molding during the blow molding process.

22. The drum of claim 18 wherein none of the at least four radii corresponds to a change of direction of substantially less than about 90°.

23. The drum of claim 18 wherein none of the at least four radii corresponds to a change of direction of less than 90°.

* * * * *